United States Patent [19]

Ramamurthi

[11] Patent Number: 5,251,144
[45] Date of Patent: Oct. 5, 1993

[54] SYSTEM AND METHOD UTILIZING A REAL TIME EXPERT SYSTEM FOR TOOL LIFE PREDICTION AND TOOL WEAR DIAGNOSIS

[75] Inventor: Krishnamoorthy Ramamurthi, Dallas, Tex.

[73] Assignee: Texas Instruments Incorporated, Dallas, Tex.

[21] Appl. No.: 687,259

[22] Filed: Apr. 18, 1991

[51] Int. Cl.$^5$ ............................................. G06F 15/46
[52] U.S. Cl. ................................. 364/474.19; 395/904
[58] Field of Search ............... 364/474.17, 474.16, 364/474.19, 551.02; 340/680, 683; 409/134; 408/6, 8, 10, 11; 395/902, 903, 904, 906, 50, 54, 60, 77

[56] References Cited

U.S. PATENT DOCUMENTS

| | | | |
|---|---|---|---|
| 4,031,368 | 6/1977 | Colding et al. | 364/474.15 |
| 4,442,494 | 4/9184 | Fromson et al. | 364/474.17 |
| 4,559,600 | 12/1985 | Rao | 364/474.17 |
| 4,658,245 | 4/1987 | Dye et al. | 364/474.17 |

OTHER PUBLICATIONS

Agogino, Alice M. And Rege, Ashutoch, "*IDES: Influence Diagram based Expert System*", Mathematical Modelling, vol. 8, Pergamon Press, 1987, pp. 227-233; presented at the fifth International Conference on Mathematical Modelling, IAMM, (Jul. 29-31, 1985, UCLA): pp. 4-6.

Emel, E. and E. Kannatery-Asibu, Jr., "Tool Failure Monitoring in Turning by Pattern Recognition Analysis of AE Signals", *Journal of Engineering for Industry*, vol. 110, May 1988, pp. 137-145.

Ramamurthi, K. and D. P. Shaver, "Reat Time Espert System for Predictive Diagnostics and Control of Drilling Operation", *Proceedings of the Sixth Conference on Artificial Intelligence Applications*, IEEE Computer Society, Mar. 5-9, 1990, pp. 63-69.

Agogino, A., Srinivas, S., and Schneider, K. M., "Multiple Sensor Expert System for Diagnostic Reasoning, Monitoring and Control of Mechanical Systems", *Mechanigcl Systems and Signal Processing*, 2(2), 1988, pp. 165-185.

Primary Examiner—Jerry Smith
Assistant Examiner—Jim Trammell
Attorney, Agent, or Firm—W. Daniel Swayze, Jr.; Leo N. Heiting; Richard L. Donaldson

[57] ABSTRACT

A system for predicting the life of a cutting tool in an automated metal cutting machine, comprises a plurality of sensors for measuring physical data relating to a cutting operation of said machine, and a computer connected to these sensors. The computer comprises a feature extractor for transforming the physical data into feature values, a tool life predictor for arriving at a prediction of the life of the cutting tool. The tool life predictor has an influence diagram having an input level of feature nodes, intermediate nodes connected to the feature nodes and to a machining class node, an output node connected to the intermediate nodes, a first module for computing averages of feature values for each sensor, a second module responsive to the feature averages for making a classification of the feature average as indicative of a long life or a short life, and a third module connected to the influence diagram for combining the classifications to arrive at a classification and a conditional probability at each intermediate node and a classification at the output node which is the predicted life of the cutting tool.

17 Claims, 8 Drawing Sheets

SYSTEM AND METHOD UTILIZING A REAL TIME EXPERT SYSTEM FOR TOOL LIFE PREDICTION AND TOOL WEAR DIAGNOSIS

NOTICE

© Copyright Texas Instruments Incorporated 1991. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention

This invention relates to manufacturing automation and in particular to a system and method for timely replacement of cutting tools through early prediction of cutting tool life and accurate diagnosis of tool wear using an Influence Diagram Expert System and multiple sensors.

2. Description of the Related Art

The background of this invention is described in conjunction with manufacturing automation as an example.

Automation in manufacturing is a rapidly growing field with significant impact on improved product quality, high productivity and reduced manufacturing cost. While it has been adopted successfully at different levels of manufacturing process, one of the main hindrances of completely automating any metal cutting operation is the timely replacement of cutting tools. Currently, human intervention is required to change the cutting tools at appropriate heuristically chosen intervals and typically, one machinist is assigned to supervise and replace cutting tools for a batch of automated machining centers. With adequate sensors for in-process monitoring of the tool condition, an improvement can be obtained in machining economics, especially in high volume production lines. Cutting tool condition monitoring, wear diagnostics and appropriate machine control problems have been investigated through different methodologies: real time expert system based approaches and mathematical model based approaches. While these on-line monitoring techniques provide a solution to correctly identify a damaged or worn tool, they are postmortem techniques; waiting for an appropriate decision after the tool is worn or damaged.

A tool changing operation may involve multiple tasks like procurement of a replacement tool from a centralized storage area, loading tool-setting software from the plant manager to the machine controller, dynamic re-scheduling of the production line to account for the anticipated machine down time, and so on. The present tool monitoring techniques do not provide adequate lead-time to initiate these multiple tasks in preparation for a tool-change, and hence, no significant improvement is made in reducing the downtime due to cutting tool changes. Another added limitation of present continuous on-line monitoring is the requirement of dedicated processors on each machine, primarily because of stringent response time requirements of the present day real time diagnostic systems.

In order to automate the cutting tool replacement task with adequate forewarning, a reasonably accurate estimate of the life of the cutting tool is required. As mentioned earlier, a significant advantage would be that the predicted tool life information could be utilized for dynamically re-scheduling machining operations and cutting tool replacements with a reduction in inventory and labor costs.

Mathematical model based techniques, called Taylor's tool life equation, and extensions thereto, may be applied to estimate the cutting tool life. However, these equations provide a poor estimate of the life of the cutting tool. For example, in the case of drilling, work piece material hardness is an important factor affecting the life of the drill but is not taken into account. While modified forms of Taylor's equation with corrections for work piece hardness have been applied to determine the drill tool life, such an approach is impractical in a production line since hardness for each work piece is not readily available or easily measurable. Furthermore, in some other machining situations, Taylor's model has been found unsuitable.

Therefore, it would be desirable to have a system in which a cutting tool's life can be accurately predicted during the initial use of the tool so as to provide adequate lead-time for the replacement of the tool.

In the area of cutting tool wear diagnosis, some present day techniques are pattern recognition (PR), neural nets (NN) and real-time expert systems (RTES). PR and NN, use pattern samples that are already classified based on some wear criteria and train the system to recognize this fact. This approach is called 'supervised learning'. In 'unsupervised learning', no wear criteria is used and hence, the knowledge about the class to which the samples belong is not available a priori. Such an unsupervised training approach using fuzzy clustering technique has been applied to the drill tool classification problem. Using thrust and torque data from a torque dynamometer, a fuzzy classification of the state of the drill tool has been performed successfully. However, the drill is classified as worn only after the cutting edges are severely damaged. This prediction is delayed until the drill is about to fail.

The advantages of the RTES techniques are the ease of modification, the ability to select optimal control decisions by optimizing over a cost function after classifying the current state of the tool, and the facility to repetitively utilize the same inference engine while applying to different machining operations. If the diagnostic system needs to be updated to handle new combinations of machining parameters or new sensors, then in case of PR or NN techniques, the system has to be retrained with new as well as old data, a rather time consuming process. However, in case of RTES, the knowledge base can be easily updated with the new information.

Heretofore, one of the problems with the present RTES technique has been the lack of learning capability. The development and tuning of the RTES requires detailed analysis of pertinent data to extract features and subjective estimate of the conditional probability distributions that form the critical elements of the knowledge base.

SUMMARY OF THE INVENTION

A system for predicting the life of a cutting tool in an automated metal cutting machine, comprises a plurality of sensors for measuring physical data relating to a cutting operation of said machine, and a computer connected to these sensors. The computer comprises a feature extractor for transforming the physical data into feature values, a tool life predictor for arriving at a prediction of the life of the cutting tool. The tool life predictor has an influence diagram having an input level of feature nodes, intermediate nodes connected to the feature nodes and to a machining class node, an output node connected to the intermediate nodes, a first module for computing averages of feature values for each sensor, a second module responsive to the feature averages for making a classification of the feature average as indicative of a long life or a short life, and a third module connected to the influence diagram for combining the classifications to arrive at a classification and a conditional probability at each intermediate node and a classification at the output node which is the predicted life of the cutting tool.

Furthermore, a method to enable a real-time expert system to learn comprises the steps of creating a relational structure corresponding to the influences that a first and a second variable have on a third variable, obtaining data for these variables over some duration of time, determining a tolerance zone around a sample which divides classes and using a dynamic distance classifier, which is responsive to the tolerance zone, to determine decision boundaries for the first and second variables and probabilities associated with the decision boundaries. The probabilities indicating the confidence with which a decision boundary classifies values of the first and second variables with respect to the value of the third variable.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

Figure 1:
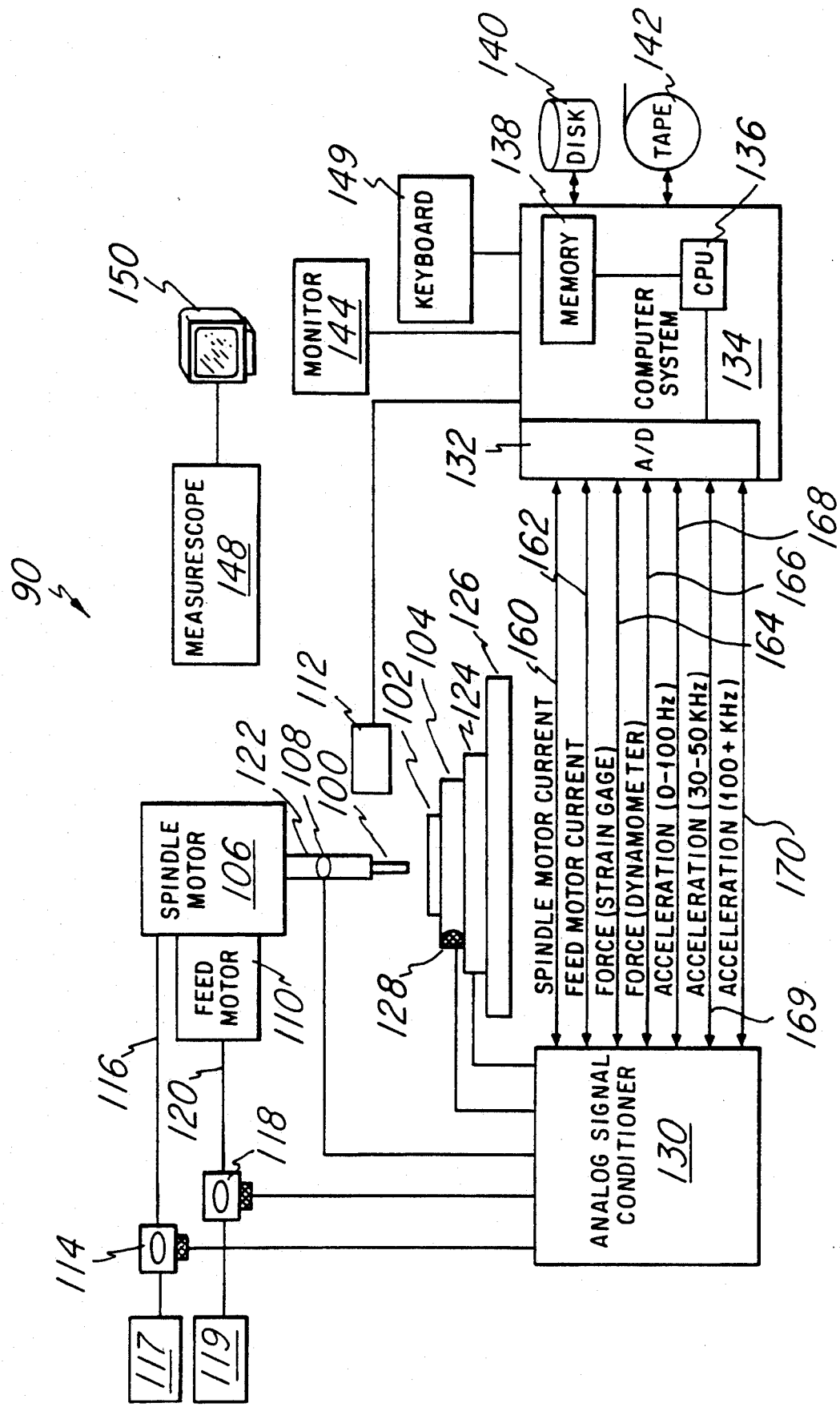
FIG. 1 is a block diagram of a computer aided manufacturing (CAM) system.

In FIG. 1, is shown in an automated manufacturing operation using this invention. A metal cutting machine 90 has a drill bit 100 attached to a quill 108, rotated by a spindle motor 106. The spindle motor 106 is connected to an AC electrical power source 117 via wires 116.

Drill bit 100 is lowered by feed motor 110 into a work piece 102 attached to a work table 126 by vise 104. Feed motor 110 is connected to a DC electrical power source 119 via wires 120.

A number of sensors measure physical data pertinent to the drilling operation of machine 90. A spindle motor current gage 114 senses the AC current transmitted through wires 116, a feed motor current gage 118 measures the DC cuttent transmitted through wires 120, a strain gage 122 is attached to quill 108 for measuring the thrust force exerted by the tool 100 on work piece 102, an accelerometer 128 senses vibrations in vise 104, and a dynamometer 124 measures the force exerted by vise 104 on table 126. The outputs from these sensors are fed into an analog signal conditioner 130 for adjusting the raw signals into a range acceptable as input by analog-to-digital converter 132. Conditioned signals from the analog signal conditioner 130 are transmitted through lines 160 through 170 into analog-to-digital converter 132 of a digital computer 134. Computer 134 contains a central processing unit 136 and a memory 138. Connected to computer 134 are monitor 144, keyboard 148, disk drive 140, and tape drive 142.

Adjacent to machine 90 is a measurescope 148 which has a monitor 150 attached to it. The measurescope 148 is positioned so that it can visually measure the wear scars of drill bit 100.

Computer 134 processes inputs from sensors 114, 118, 122, 124, and 128 to predict when drill bit 100 will be worn out and at the end of predicted life to monitor drill bit 100 for wear on a continuous basis. The prediction and diagnosis of wear may either be displayed on monitor 144, for a human operator to take some action, such as replacing the tool, or may initiate the automatic procurement and replacement of drill bit 100. The replacement may be done by some process control hardware 112 attached to computer 134.

During certain phases of the operation of machine 90, computer 134 will be idle with respect to processing data and controlling machine 90. That idle time may be used to service other machines (not shown). Thus, computer 134 may be used to predict tool life and diagnose tool wear in multiple machines which operate in parallel.

Figure 2:
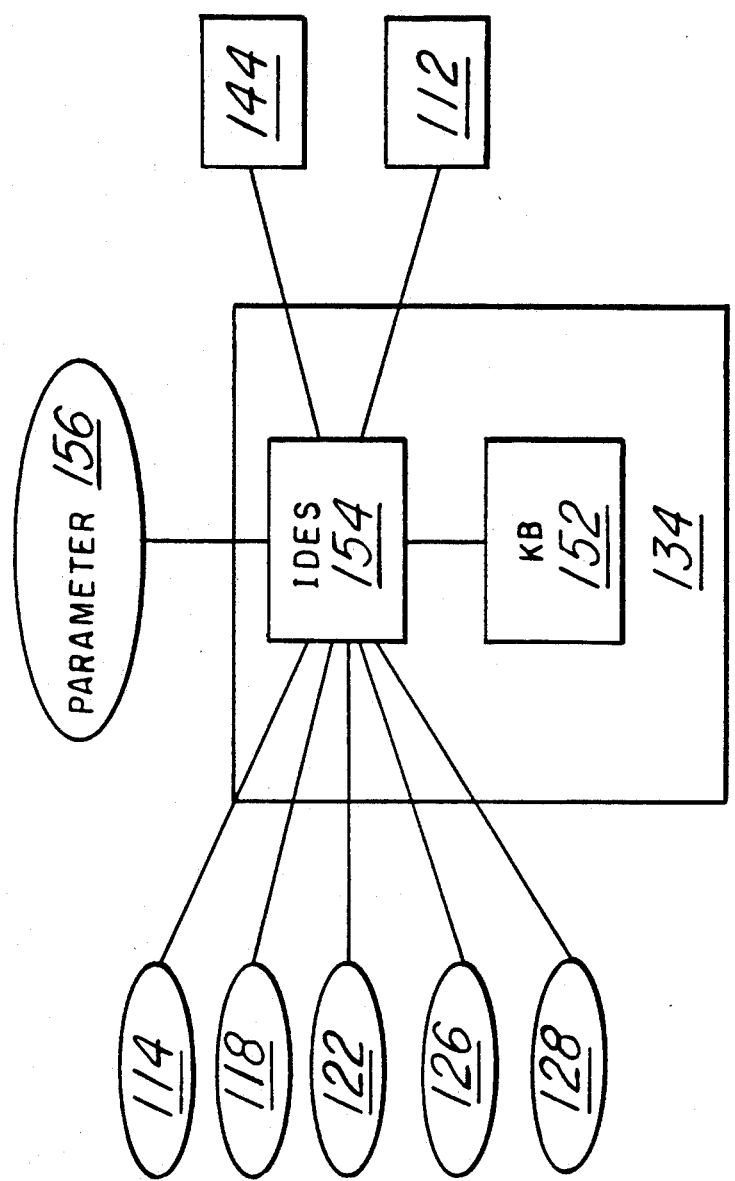
FIG. 2 is a schematic diagram showing the logical links between sensor data in a CAM system and an Influence Diagram Expert System (IDES).

The operation of machine 90 is controlled by an Influence Diagram Expert System (IDES) 154 shown in FIG. 2. As FIG. 2 shows, computer 134 executes Influence Diagram Expert System (IDES) 154. It predicts the length of life of drill bit 100, monitors drill bit 100 for wear, and initiates the replacement procedure when drill bit 100 has been diagnosed as worn out. FIG. 2 shows a schematic of the logical links between sensor data 156 and IDES 154. The sensor data is, for example, sensors 114, 118, 122, 124, and 128, of FIG. 1. IDES 154 is also connected to knowledge base 152, in which IDES 154 stores information it uses to process data obtained from the sensors to make decisions which are displayed on monitor 144 or which initiate some action on the part of process control hardware 112. Knowledge base 152 may be physically located in memory 138 of FIG. 1, on disk 140, on tape 142, or distributed over these devices or other storage devices not shown.

IDES 154 is also logically connected to parameters 156. These may, for example, be entered from keyboard 148, of FIG. 1, or retrieved from data files on disk 140 or tape 142. Parameters 156 includes, for example, information for categorizing the machining operation, such as, tool size, work piece material, drill feed rate, and drill speed.

The operation of machine 90 and IDES 154 consists of the following phases:

1. An experimental phase in which the drilling operation is carried out and sensor measurements are taken at regular intervals throughout the life of the tool. Furthermore, the point at which the drill has been worn out, i.e., its life has been expended, is noted. As each hole is drilled its number is noted and each data point is indexed by it. Similarly, the point at which the tool is deemed to have been worn out is also noted by hole number. This experimental data is later used to build knowledge base 152 for both tool life prediction and tool wear diagnosis. The knowledge base 152 may be stored on disk 140 or tape 142.

Both raw sensor data and quantities computed from the raw sensor data are used in both tool life prediction and tool wear diagnosis. The manner in which the computed quantities are derived from the raw sensor data is discussed in greater detail below. The raw sensor data and the computed quantities are collectively called features.

2. A training phase, in which the knowledge base is built and fine-tuned consists of two distinct aspects: first, building the knowledge base for accurate prediction of tool life and, second, the knowledge base for the diagnosis of tool wear. Certain portions of the training phase are automated by using the Dynamic Distance Classifier algorithm described below.

3. An operations phase in which IDES 154, utilizing the knowledge base which was built during the training phase, predicts tool life and monitors tool wear.

Thus, the goal is to build a knowledge base which an IDES 154 uses to predict tool life and to monitor drill wear. The training phase is more easily understood if the operations phase is considered first.

OPERATIONS PHASE

Figure 3:
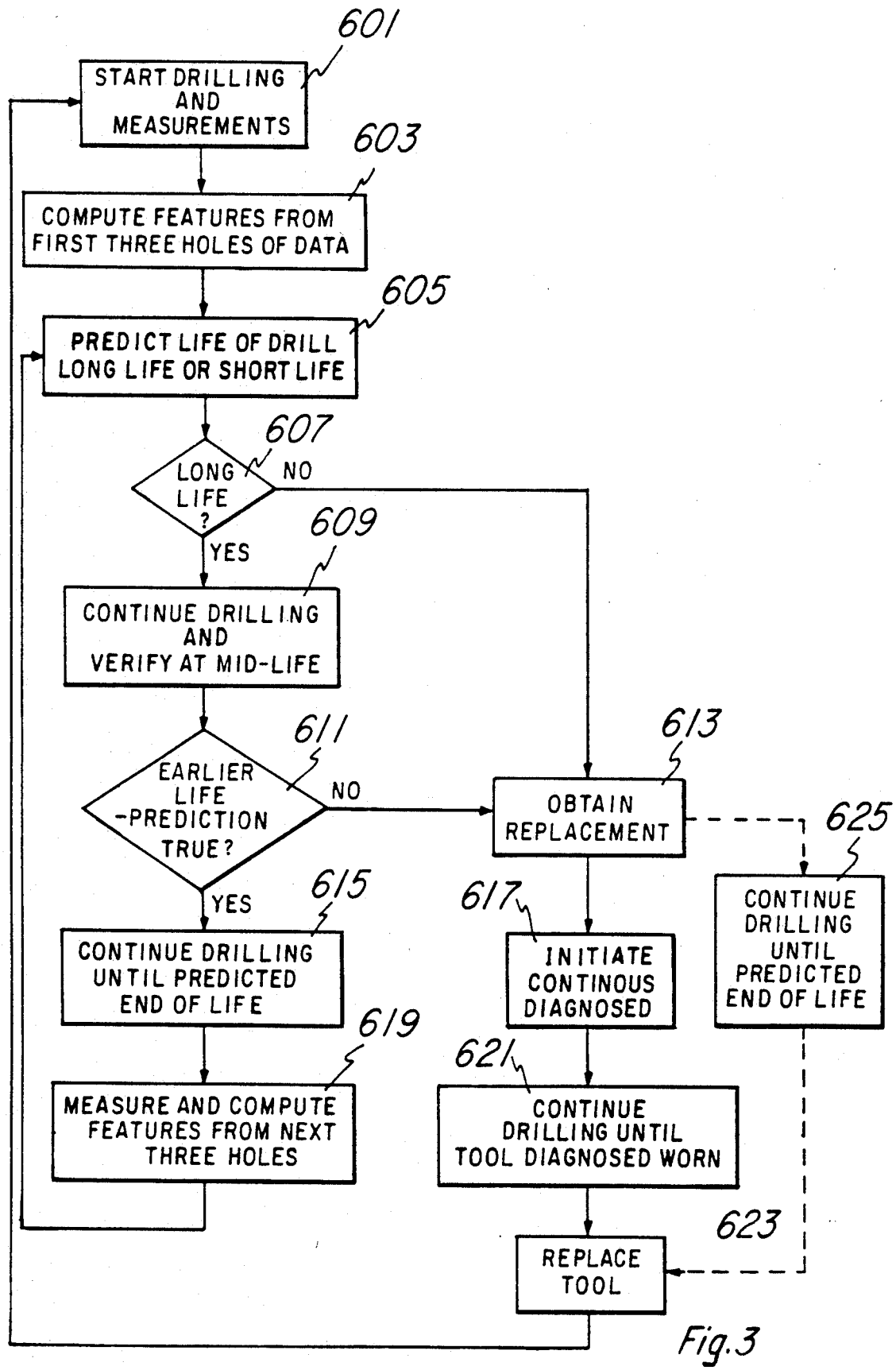
FIG. 3 is a flow chart for operating a CAM system using an IDES to predict tool life and to monitor tool wear.

FIG. 3 is a flow chart showing the operation of a computer aided manufacturing operation according to the present invention. A drilling operation starts at Step 601. In conjunction with the drilling, measurements are taken from the various sensors used in the Influence Diagram to predict tool life. Early in the operation, for example after three holes, the features are computed, Step 603. These features are used by IDES 154 to predict the life of drill 100, Step 605.

If the prediction is that the tool will have a long life (Step 607), the machine continues drilling until the tool's predicted mid-life, Step 609. At which point, a verification procedure is invoked. If the earlier prediction of a long life is verified the drilling continues until the end of the predicted life of the tool, Step 615. At that point sensor data is collected and features computed for the next three holes, Step 619. The process cycles back to predicting the remaining life of the drill, Step 605.

During the time between prediction of a "long life" (Steps 605 and 607) and the verification at mid-life (Step 609) computer 134 does not process data from machine 90. Thus, during that time, computer 134 is available for other tasks, for example, servicing other machines attached to it.

If a long life is not predicted in Step 605, or if a predicted long life is not verified at the predicted mid-life in Step 609, then a replacement tool is obtained, Step 613. One embodiment is represented by the dashed path from Step 613 to Step 623. Drilling continues until the predicted end of the life of the tool, Step 625. The tool is replaced at the point at which IDES 154 has predicted that the tool's life ends, Step 625.

An alternative embodiment is indicated by the solid path emanating from Step 613. Because it is desirable to never use a tool beyond the point at which it is worn out, the tool life prediction is adjusted to be a conservative estimate. For that reason, tools which have not worn out may have been predicted as worn out. Rather than discarding such tools, the embodiment represented by the path through Steps 613, 617, and 619, provides a method for using the sensors 114, 118, 122, 126, and 128, to diagnose the tool for wear. Thus, IDES 154 continuously monitors the sensors and diagnoses tool wear, Step 617, and drilling continues, Step 621, until IDES 154 diagnoses the end of the life of the tool, Step 621. When the tool has been expended the tool is replaced, Step 623. The entire operation starts over with the fresh drill at Step 601.

The method described above in conjunction with FIG. 3 may be implemented to be executed on computer system 134. One embodiment has a functional module to compute features from the raw sensor data (Step 603), a functional module each for the tool life prediction (Step 605), the verification of the prediction (Step 609), and the tool wear diagnostics (Steps 617 and 621).

TRAINING PHASE

Figure 4:
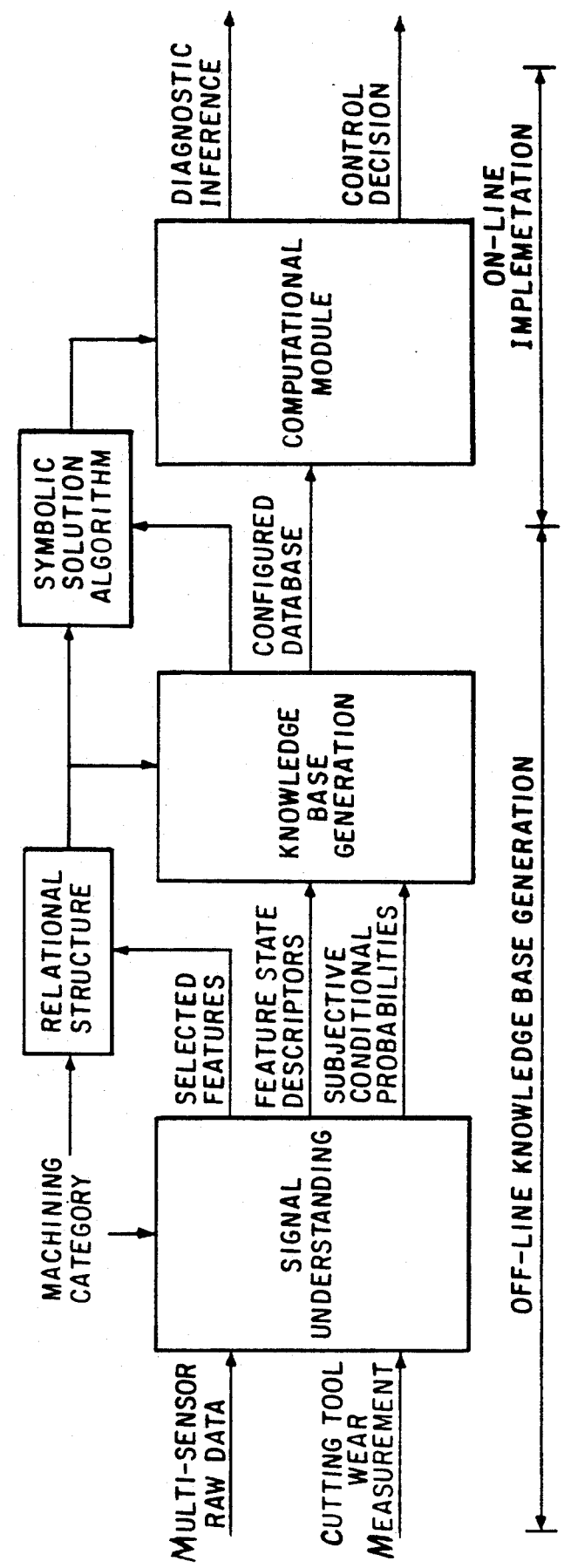
FIG. 4 shows the relationship of the training phase to the operations phase.

FIG. 4 shows the relationship of the training phase for tool life prediction to the operation of the IDES 154 and the automated manufacturing system shown in FIG. 1. A similar approach is used for training the system for tool wear diagnosis.

The training operation may be divided functionally into two major categories: off-line knowledge base generation and on-line tool-life prediction. The off-line task generates the qualitative and the quantitative knowledge base for the influence diagram model of the drilling process. The knowledge base is used by the real-time system for on-line prediction of tool-life and tool wear diagnostics. The input to the system are the multi-sensor raw data and the cutting tool wear measurements collected during the experimental phase as well as the machining category. The term "machining category" represents the combinations of machining parameters that are used for collecting the training data. When the machining parameters vary considerably, the sensor features also vary widely. Hence, without any knowledge about the machining conditions and with just the sensory data it is difficult to establish a diagnostic mapping between the sensory features and the cutting tool state. Subsequently, the knowledge engineer divides the broad spectrum of machining conditions into several categories such that each category represents the machining parameters that resemble close to each other. An example of machining categories is given in Table 1.

TABLE 1

| Categorization of Widely Varying Machining Conditions | | | | |
|---|---|---|---|---|
| Category | Workpiece material | Drill size/type | Speed (rpm) | Feedrate (inch/rev.) |
| 0 | Ductile cast iron | 0.25" Tungsten | 1100–1400 | 0.006–0.011 |
| 1 | Ductile cast iron | 0.25" Tungsten | 1600–2000 | 0.003–0.006 |
| 2 | A36 steel | 0.25" High Speed Steel | 3600–3900 | 0.002–0.004 |
| 3 | A36 steel | 0.25" High Speed Steel | 2300–2700 | 0.002–0.004 |
| 4 | A36 steel | 0.25" High Speed Steel | 2300–2700 | 0.008–0.010 |

TABLE 1-continued

Categorization of Widely Varying Machining Conditions

| Category | Workpiece material | Drill size/type | Speed (rpm) | Feedrate (inch/rev.) |
|---|---|---|---|---|
| 5 | A36 steel | 0.125" High Speed Steel | 3700–4000 | 0.006–0.007 |
| 6 | A36 steel | 0.125" High Speed Steel | 3700–4000 | 0.009–0.010 |
| 7 | A36 steel | 0.125" High Speed Steel | 2900–3100 | 0.009–0.010 |

The knowledge base generation is divided into several subtasks: feature selection, building the relational structure, determining feature state descriptors, and subjective estimation of the conditional probability distributions.

1. Feature Selection

In FIG. 1, the spindle motor current sensor 114 is an AC current sensor. It is a noninvasive induction sensor that is simply clipped around the input power line. The AC current sensor output is rectified and low pass filtered in order to acquire low frequency energy of the sensor signal. This energy is directly proportional to the cutting torque exerted by the tool on the work piece. As the tool wears, the cutting force experienced by the tool increases. This increase in cutting force causes a corresponding increase in spindle motor current. The RMS value of spindle motor current thus becomes a valuable feature for observing the trend in tool wear during the initial phase of drilling.

In addition to the RMS value, the change in RMS value compared to a fresh tool ($\Delta$RMS) is a useful feature as it indicates the temporal trend of the cutting torque. A faster rate of change indicates a rapid wear and hence shorter tool life.

Another valuable source of information about the drilling process is the spindle mounted strain gage 122. It indicates the thrust force exerted by the tool 100 on the work piece 102. As the tool 100 wears, the thrust forces increase due to a constant feed rate and an increase in energy required to penetrate the work piece 102. The actual value used is the mean of the strain gage force during the drilling of one hole.

Furthermore, as in the case of the spindle motor current sensor 114, the raw value (the mean) as well as its incremental change from a fresh tool ($\Delta$mean) are used to predict the tool life.

In the preferred embodiment the features extracted from the measurements of the spindle motor current sensor 114 and the strain gage sensor 122 are used to predict tool life and to continuously diagnose tool wear at the end of the predicted life of the tool. However, in an alternative embodiment other sensors, for example the feed motor current sensor 110, the accelerometer 128, and the dynamometer 124, are used either in lieu of or in conjunction with either the spindle motor current sensor 114 or the strain gage sensor 122.

2. Building the Relational Structure

Figure 5:
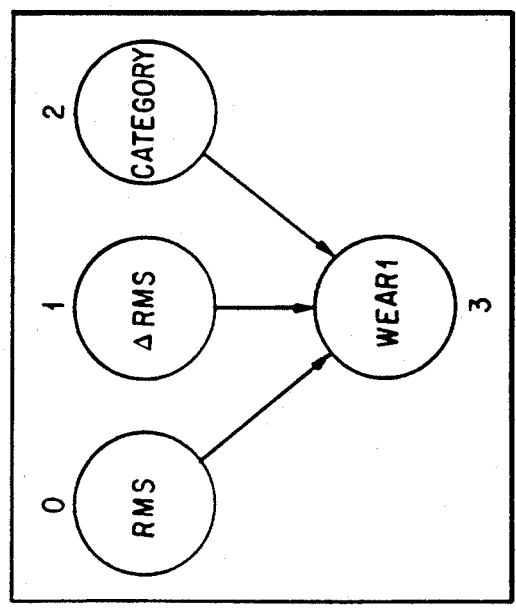
FIG. 5 shows an example influence diagram.

An Influence Diagram Expert System (IDES) is an expert system in which relationships between variables are qualitatively and quantitatively represented and manipulated to arrive at some decision. An influence diagram, i.e., the relational structure, which is a graphical network and theoretical structure for knowledge, provides probabilistic inference and expected value decisions, and has two hierarchical levels: symbolic and quantitative. At the symbolic level, an influence diagram consists of an acyclic directed network with nodes representing relevant system state variables and the arcs representing state variable interrelationships. For example, the diagram in FIG. 5 is a simple influence diagram which schematically shows the probabilistic influence three variables, RMS, $\Delta$RMS, and category, have on the state of a cutting tool (wear1). At the quantitative level the mapping between the relevant states are represented by discrete conditional probability density functions. For example, in the sample influence diagram in FIG. 5, node 3 would be quantitatively represented by the conditional probability {wear1|RMS, $\Delta$RMS, category}. Also, in a general model, the root nodes 1, 2, and 3 are quantitatively represented by their respective marginal probabilities. However, when the influence diagram technique is used in a real-time paradigm, they are represented by uniform distributions. A diagnostic inference, for example, the marginal probability of the cutting tool being worn, results from a set of transformations applied to the diagram in response to a specific query. The topological structure remaining after the set of transformations represents the answer to the query in symbolic form. At the quantitative level, these transformations would provide the answer to the query in numerical form. Three types of transformations used in this reduction process are Sensor Node Removal (table look-up operation), State Node Removal (applying summation rule of probability) and Arc Reversal (applying Bayes' rule). Once diagnostic inference has evaluated the likelihood of critical events, the best course of action must be determined.

Figure 6:
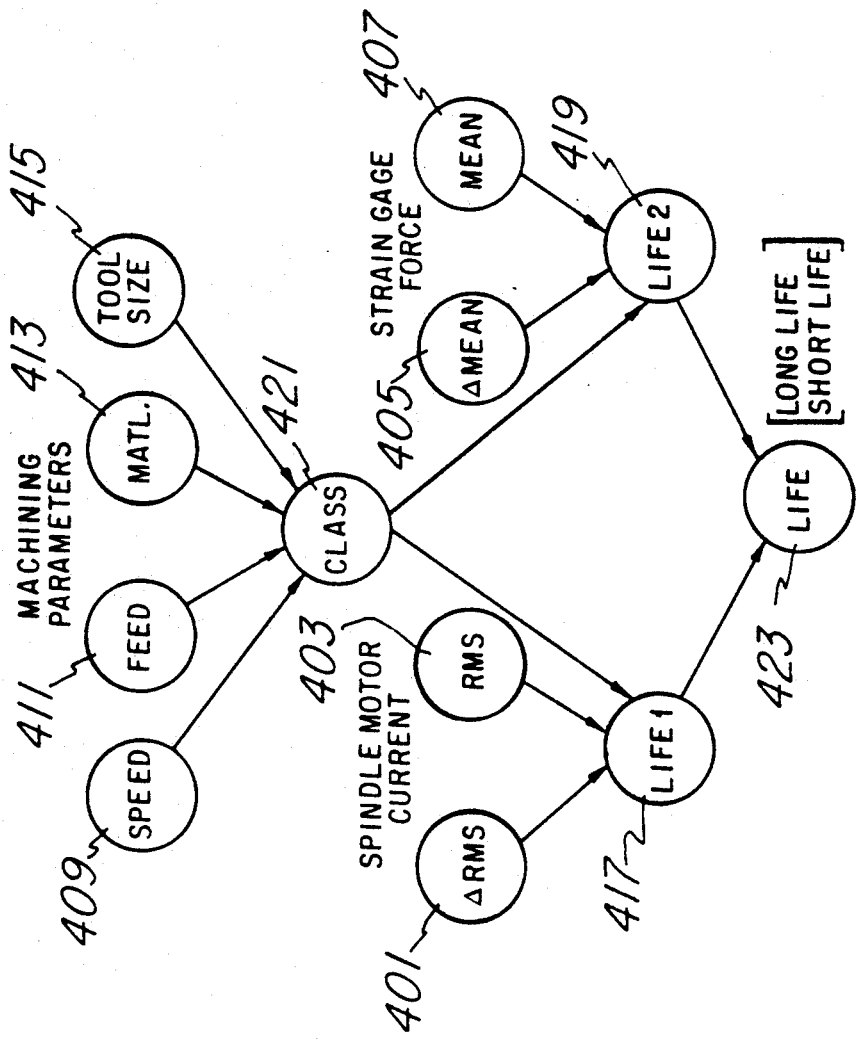
FIG. 6 shows the influence diagram topology for predicting tool life according to the present invention.

FIG. 6 is an influence diagram for predicting tool life in the preferred embodiment. Verification uses an influence diagram with the same topology. However, at the numerical level, the state space of each feature and the subjective estimates of the probability distributions are different for different phases. Hence, the portion of the knowledge base corresponding to the influence diagram for the verification phase is different from the corresponding portion of the prediction phase.

The features $\Delta$rms and rms from the spindle motor current sensor influence the life1 variable, an intermediate node in the influence diagram, strain gage force features $\Delta$mean and mean influence the life2 variable, and machining parameters speed, feed, work-piece material and tool size influence the class variable. The latter is not a probabilistic influence but rather a categorization. An example categorization based on these particular parameters is shown in Table 1. However, other categorizations are possible. The class variable also influences the life1 and life2 variables. The range of values for life1 and life2 is "long life" or "short life." Thus, given particular values of each feature, for example rms and $\Delta$rms, both values together indicate with a particular conditional probability that the value of life1 is "long life."

Finally, life1 and life2 influence the life variable, which is an output node in the influence diagram. The values available for the life variable is "long life" and "short life". Both of which are values dependent on the type of tool in question. For example, for 0.25" drills, based on experimental results, "long life" is defined as 100 holes and "short life" as 10 holes, and similarly for 0.125" drills, "long life" corresponds to 50 holes and "short life" to 7 holes. However, in alternative embodiments these definitions may be different.

3. Determining Feature State Descriptors

The quantitative level of the influence diagram, as part of knowledge base 152, each node is divided into many states depending on the range of values, symbolic or numerical, the variable can take. The values that divide the range into many states are referred to as the state descriptors. The number of states varies. For example, for the life node 423, the life1 node 417, and the life2 node 419, there are two states "long life" and "short life." The class node 421, has as many states as the total number of categories, e.g., eight in the case of Table 1. In one embodiment, using the categories in Table 1, node 415 has "0.25-inch" and "0.125-inch" states, and node 413 has the states "steel" and "cast iron." Thus, the states for nodes 423, 417, 419, 415 and 413, are all qualitative. The remaining nodes in FIG. 6 have state descriptors defined by quantitative intervals. The states for nodes 409 and 411 are obtained by dividing the normal operating ranges of speeds and feeds respectively, over as many intervals as needed to uniquely define each category in Table 1. For node 411, and Table 1, a state 0 represents feed rate less than 0.008 ipr, and a state 1 represents feed rates greater than or equal to 0.008 ipr. Similarly, in the case of node 409, a state 0 is defined by drill speeds less than 3200 rpm, and a state 1 is defined as speeds greater than or equal to 3200 rpm. In the case of feature nodes 401 through 407 the state descriptors are decided by analyzing and correlating the raw experimental data with the actual life for the tool for all the categories.

Figure 7:
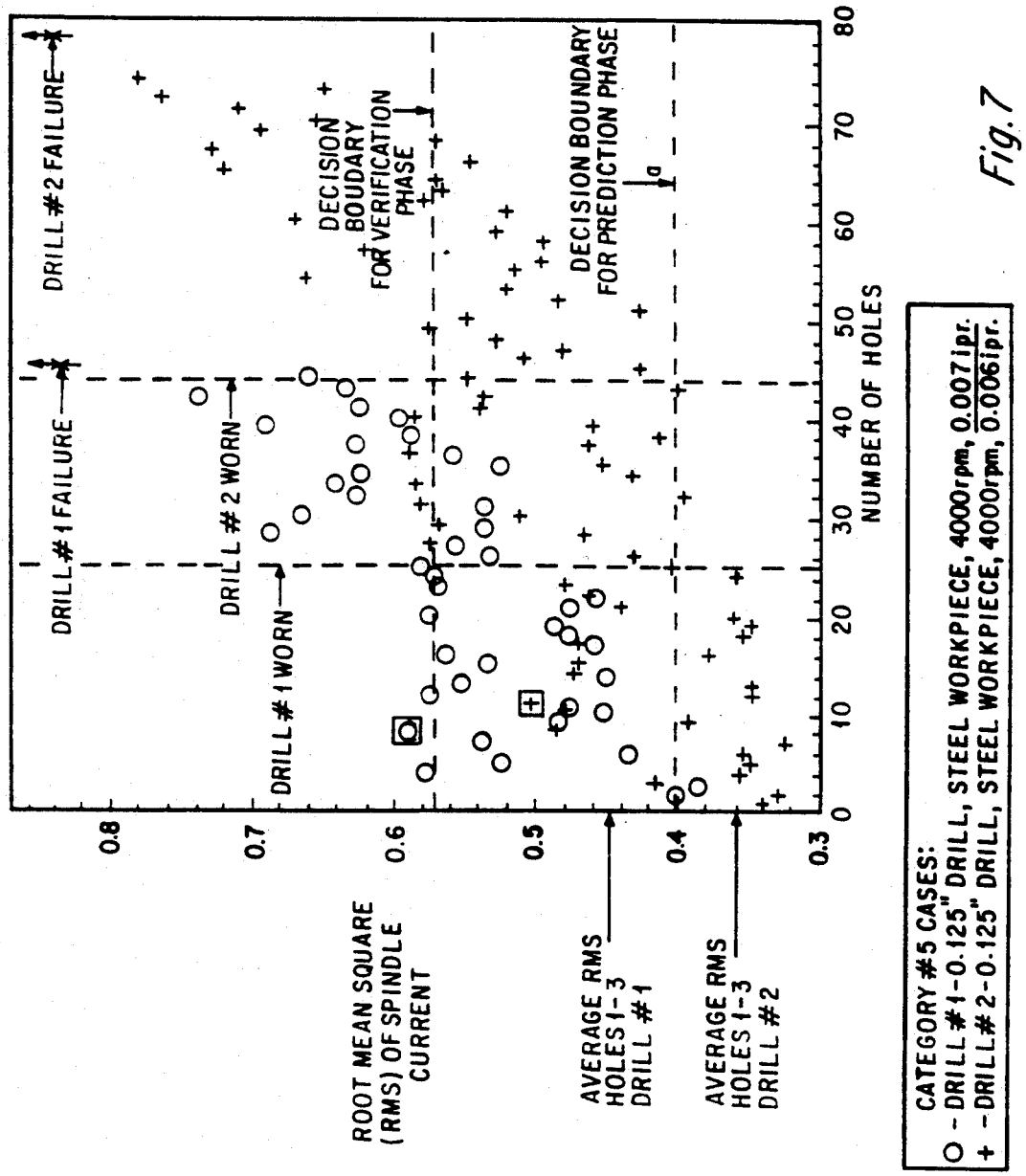
FIG. 7 is a graph of experimental data used during the training phase of the present invention.

FIG. 7 is an illustration of raw data collected for two category 5 cases. It illustrates how to obtain the decision boundaries associated with the RMS feature. Thus, the figure represents a specific feature, RMS, of node 403, and a specific category, category 5. The experimental data may be plotted in similar graphs for other features and categories. In FIG. 7, the RMS feature of spindle current signal for both drills is plotted as a function of number of holes drilled. Each point in the graph represents the RMS value for signals collected for one hole. The vertical dotted lines (labeled "Drill #1 Worn" and "Drill #2 Worn", respectively) indicate the hole number at which the drills were actually declared as worn by wear measurement criterion. This hole will be referred to as the "wear hole." The circles to the left of vertical line for drill #1 belong to the good tool condition and ones to the right belong to the worn tool condition for drill #1. Similarly drill #2 is represented by plus symbols. Note that the life of Drill #1 is a "long life" whereas the life of Drill #2 is a "short life." The objective is to select one threshold (horizontal line called decision boundary) value that separates the "long life" state from the "short life" state for both the drills. For the prediction phase the average RMS value for the first three holes is used. Thus, the decision boundary for the prediction phase (labeled a) is selected so that the average RMS value for the first three holes will indicate whether a "long life" is indicated or not. In the example of FIG. 7 the average RMS for the first three holes of Drill #1 is approximately 0.45 and the average RMS for the first three holes of Drill #2 is approximately 0.36, therefore the selected decision boundary for RMS for Category #5 drills is 0.4. Similar analysis is done for the verification phase. However, in the case of verification the maximum feature values for the drills up to the mid-life is used rather than the average for the first three holes. In the case of Drill #1 the max value is 0.59, as indicated by the boxed ring. The max value for Drill #2 is 0.5. Therefore, the selected decision boundary for the verification phase for RMS for category #5 drills is 0.57.

The decision boundaries for all features and all categories is done in the same manner as explained above for RMS and category #5. Thus, a quantitative knowledge base of decision boundaries is built.

4. Subjective estimation of the conditional probability distributions.

The next step is to assign marginal probabilities associated with the decision boundaries. The marginal probability for a given feature and category is a subjective evaluation on the part of the knowledge engineer. It indicates the probability that the decision boundary accurately predicts "long life."

Having assigned the marginal probabilities for all feature nodes 401 through 407, the knowledge engineer determines conditional probabilities for the intermediate nodes 417 and 419. The class node, node 421, representing machining category, is assigned a binary deterministic conditional distribution (0 or 1) given any element of its conditional cross product space consisting of all the combinations of states of the predecessor nodes 409 through 415.

Using node 417 as an example, for each of the predecessor features rms (node 403) and Δrms (node 401) a subjective weight on a scale of 0 to 1 is assigned based on how well each decision boundary separated the "short life" from the "long life" states of all the categories. Let these weights be $w_{403}$ and $w_{401}$ for rms and Δrms, respectively. For each category, critical states are identified for nodes 401 and 403, below which the feature values correspond to the "long life" state and above which the feature values correspond to the "short life" state. For some category c, let $s_{403}$ and $s_{401}$ be the critical states for nodes 403 and 401 respectively. Let $\Omega_{403}$ and $\Omega_{401}$ be the state spaces for nodes 403 and 401 respectively. The conditional probability assessment is made as follows.

For category c, the conditional probability, P, that the node 417 is in "short life" for $(i \times j)$ $\Omega_{403} \times \Omega_{401}$ $$P = \max(w_{403}, w_{401}) + \Delta_1(Q - 1); \quad \text{if } i \geq s_{403}, j \geq s_{401}$$

$$P = \frac{w_{403}}{w_{403} + w_{401}} + \Delta_2(Q); \quad \text{if } i \geq s_{403}, j < s_{401}$$

$$P = \frac{w_{401}}{w_{403} + w_{401}} + \Delta_3(Q); \quad \text{if } i < s_{403}, j \geq s_{401}$$

$$P = 0.0; \quad \text{if } i < s_{403}, j < s_{401}$$

where $$Q = (i + j + s_{403} - s_{401} + 1)$$

and $\Delta_1$, $\Delta_2$, and $\Delta_3$ are smoothing factors that gradually change the conditional probabilities in discrete steps as the features' states gradually change from those corresponding to a drill with a short life to those corresponding to a drill with a long life. They typically assume values ranging from 0.05 to 0.1, and are chosen subjectively. All these subjective quantities are different for different categories and this procedure is repeated for all the categories. While tuning the knowledge base, they are iteratively updated until the system responds correctly for the training data. Typically no more than five iterations are necessary. The equations above are heuristic, and a person skilled in the art will realize other possible equations.

Figure 8:
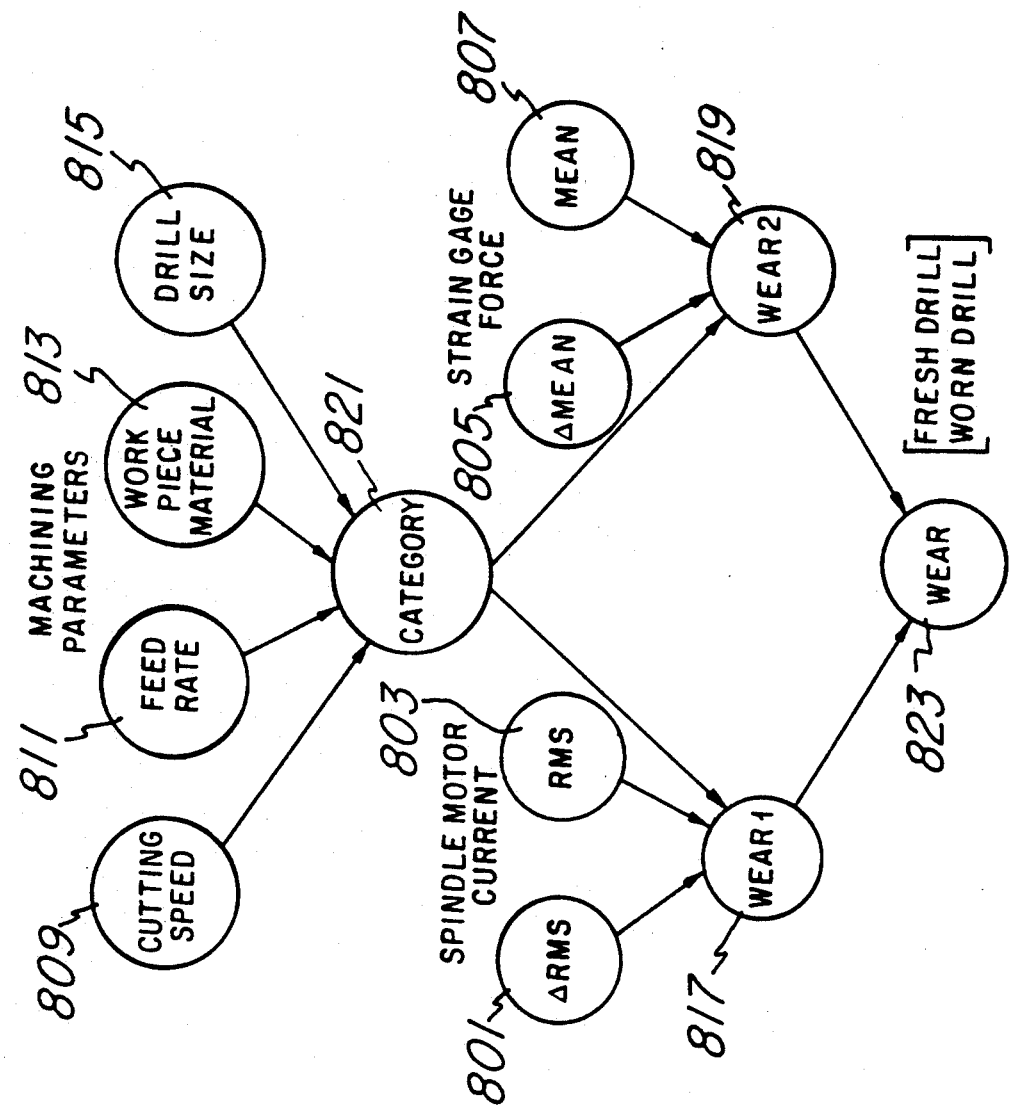
FIG. 8 shows the influence diagram topology for monitoring tool wear according to the present invention.

As to the training phase with respect to tool wear diagnosis, FIG. 8 shows the topology of the influence diagram used by IDES 154 during the continuous diagnosis of drill wear in Step 617, of FIG. 3. A comparison with FIG. 6 indicates the similarity between the influence diagram for tool life prediction and tool wear diagnosis that takes place at the end of the predicted life of the tool. However, interior and output nodes differ. In the tool wear diagnosis influence diagram, the features derived from the spindle motor current influence the wear1 variable and those derived from the strain gage force influence the wear2 variable. Those intermediate nodes influence the output node, wear. The values for wear1, wear2 and wear are "Fresh drill" and "Worn drill." Furthermore, at the numerical level, the decision boundaries and probabilities differ from the influence diagrams associated with tool life prediction.

Figure 9:
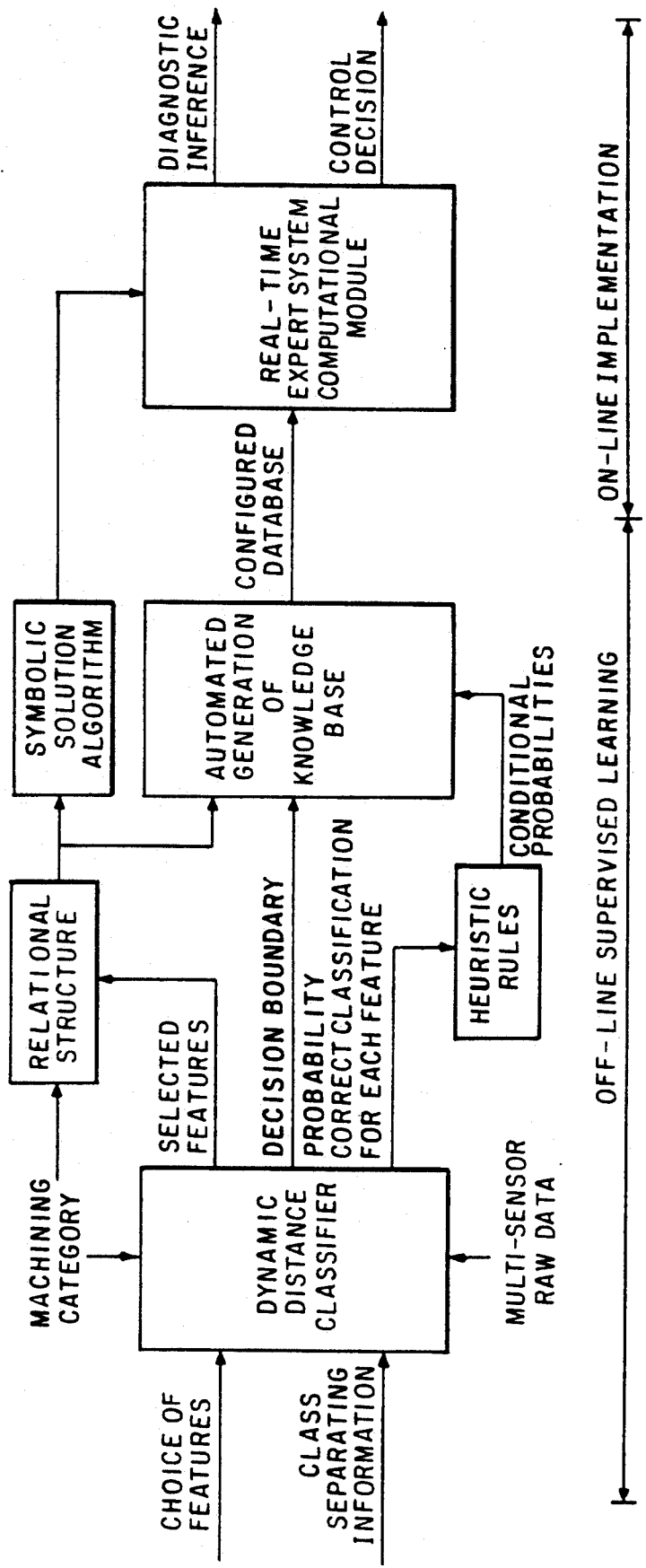
FIG. 9 is a flow chart showing how a dynamic distance classifier according to the present invention is utilized in a computerized machining operation.

In the case of tool life prediction discussed above the knowledge base is manually built by a knowledge engineer. The knowledge base for the continuous diagnosis of tool wear (of Step 621 of FIG. 3) is automatically created using a dynamic distance classifier. FIG. 9 shows the relationship of the dynamic distance classifier to the total operation of the computer aided manufacturing system having an influence diagram expert system.

The dynamic distance classifier generates the decision boundaries between the fresh and worn tool classes as well as the probability of correct classification for each feature. It uses the Euclidian distance between the sample points and the mean of each class as the measure for classification. It bears the name "dynamic" due to an iterative update of the fresh tool class mean based on a new separability criterion defined below. The method is generic in that it is applicable to drilling as well as other machining operations, for example milling or turning. Furthermore, applications outside of the computer aided manufacturing environment will be apparent to a person skilled in the art.

The method assumes that the data is collected at regular intervals for a short period of time and the sample points, classified based on some tool wear criteria, represent a time history of the state of the tool. This assumption is not a restriction but is in-line with the true situation in a machining environment.

1. Nomenclature

The variables used in the method are defined as follows:
$C_0$—Fresh cutting tool class
$C_1$—Worn cutting tool class
d—Decision boundary
w—Actual sample # that divides classes
T—Tolerance zone, in terms of number of samples, about w (e.g., T={4,5,6,7} given w=5)
$w_{min}$—Minimum of i for all i ∈ T (e.g., $w_{min}=4$ given T={4,5,6,7})
x—Feature under evaluation for its classification capability
$x_i$—Value of x at $i^{th}$ sample
$g_i$—The feature mean of class $C_i$
p—Probability of successful classification for the feature under evaluation 2. Separability Condition for Cutting Tool Classes Conventionally, in pattern classification using linear discriminant function F, two classes $C_0$ and $C_1$ are separable if $F(x_i)<0$ for all $x_i$ ∈ $C_0$ and $F(x_i)>0$ for all $x_i$ ∈ $C_1$, where $x_i$ denotes the feature value for sample i and the decision boundary d is defined by $F(d)=0$.

Since it is undesirable to have any fresh tool states to be classified as worn, the condition $F(x_i)<0$ for all $x_i$ ∈ $C_0$ is a requirement for correct classification. After w samples the tool is defined as worn based on some wear criterion. For conventional separability, the classifier diagnoses the tool to be worn for each sample collected beyond the $w^{th}$ sample. However, in case of robust diagnosis, at the first instance of wear diagnosis, a decision would have been made; either to replace the cutting tool or continue operation in degraded mode, depending on the economics of that particular machining operation. Hence it is sufficient that there exists just one correct classification of the worn drill within a tolerance zone (T) of a few samples about the actual worn tool sample w. The tolerance zone T may consist of a few fresh tool samples before the worn tool sample w (as indicated in the definition of T). Consequently, fresh and worn tool classes are defined as separable if
  1. $F(x_i)<0$ for all $x_i$ ∈ $C_0$ and
  2. there exists i ∈ T such that $F(x_i)>0$, i.e., $x_i$ ∈ $C_1$ This relaxed but adequate separability condition simplifies the search for a decision boundary that would provide robust classification. For each individual feature, this decision boundary is nothing but a point. This one dimensional search for the decision boundary is considerably faster than the search for the n-dimensional decision surface where the features are arranged into an n-dimensional vector.

3. Classifier Method

The following pseudocode determines the decision boundary and the marginal probability for each feature.

---
For (x = Feature(1) to Feature(n) )
Begin For loop 1
 (1) Compute mean of each class ($g_j$, j = 0,1).
 (2) If ($g_0 \geq g_1$) then return (p = 0) and exit.
 (3) For (i = First sample to Last sample)
  Do classification using decision rule,
   $x_i$ ∈ $C_k$ if $|x_i - g_k| = \min |x_i - g_j|$, j = 0,1
 (4) If ($x_i$ ∈ $C_0$ for all i ∈ T) then return (p = 0) and exit.
 (5) If ($x_i$ ∈ $C_0$ for all i < $w_{min}$) and
  (there exists i ∈ T such that $x_i$ ∈ $C_1$) then $$\text{return } d = \frac{g_0 + g_1}{2}$$
    and exit.

(6) While ( there exist i ∈ T such that $x_i$ ∈ $C_j$)
   and (there exists i ∈ T such that $x_i$ ∈ $C_1$)
  BEGIN While -continued For (x = Feature(1) to Feature(n) )

$$d = \frac{g_0 + g_1}{2}$$

$$p = 1 - \frac{s}{w_{min} - 1};$$

where $s = S$,
$S = \{x_i \quad C_1 \text{ for all } i < w_{min}\}$ $$g_0 = \frac{g_0 + \sum_i x_i}{s + 1};$$

where $x_i \quad C_1$ for all $i < w_{min}$

If $(g_0 \geq g_1)$ then exit While loop.
Repeat step (3) only.
END While
(7) If $(x_i \quad C_0$ for all $i < w_{min})$ and (there exists $i \quad T$
such that $x_i \quad C_1$ then $$\text{return} \left( d = \frac{g_0 + g_1}{2} \text{ and } p = 1 \right) \text{ and exit.}$$

else return (d,p) and exit.
END For loop 1

Thus, the dynamic distance classifier computes decision boundaries (d) and their associated probabilities for correct classification (p) for each feature under consideration. The dynamic distance classifier relies on a predetermined tolerance zone T, for timely diagnosis of tool wear, and the fact that samples are sequential in time, to minimize the generation of false alarms. A false alarm is a diagnosis of a tool as being worn that is made while the tool is still good, i.e., before the tolerance zone. In step 6, by iteratively updating the relevant parameters until the condition terminating the While loop has been satisfied, false alarms are avoided. Furthermore, p is weighted by s, the number of false alarms.

Returning to FIG. 9, the heuristic rules for computing the conditional probabilities when using the dynamic distance classifier differ from those described above with respect to tool life prediction and verification of tool life prediction. The decision boundaries generated by the dynamic classifier are assigned as the state boundaries for each feature node. Using the marginal probability of correct classification for each feature, some heuristic rules are used to automatically generate the overall knowledge base for the real-time expert system. In the influence diagram of FIG. 8, for the rms node 803, the decision boundaries for each category 0 to c, be denoted by $a_1 \ldots a_n$, where $n \leq c+1$, and the corresponding marginal probabilities for correct classification is denoted by $r_1 \ldots r_n$ (n can be less than c+1, because the decision boundaries of some of the categories may be made to coincide if they lie close to each other. Similarly, $b_1 \ldots b_n$ and $r_1 \ldots r_n$ denote the decision boundaries and marginal probabilities for the $\Delta$rms node 801. The node rms 803 is divided into n+1 states and the node $\Delta$rms is divided into m+1 states. For example, node 803 is in state 0 if $x < a_1$, in state 1 if $a_1 \leq x \leq a_2, \ldots$ in state n if $x \geq a_n$, where x is the rms feature value. The node 821 is in state 0 if the machining parameters correspond to category 0, ..., state c if the category is c. Also, the wear1 node 817 is divided into two states, state 0 for a fresh tool and state 1 for a worn tool. If k is the state of the category node 821, the critical state corresponding to the decision boundary and probability for the rms feature are k1 and $r_{k1}$, respectively, and for $\Delta$rms, k2 and $s_{k2}$.

Based on the above definitions, for each point (x x y) in the conditional cross-product space $(\Omega_{803} \times \Omega_{801})$ of nodes 803 and 801, where x and y denote respectively the current state of nodes 803 and 801, the following heuristic rules are used to compute the conditional probability that the wear1 node is in state 1, i.e., worn tool state.

Conditional probability that node wear1 817 is in "worn drill" state for (x x y) $(\Omega_{803} \times \Omega_{801})$ $$= 1.0 \quad \text{if } x \geq k_1, y \geq k_2$$

$$= r_{k1} - \left[ \frac{k_1 + k_2 - x - y - 1}{m + n + 2} \right] \quad \text{if } x \geq k_1, y < k_2$$

$$= s_{k2} - \left[ \frac{k_1 + k_2 - x - y - 1}{m + n + 2} \right] \quad \text{if } x < k_1, y \geq k_2$$

$$= \left[ \frac{r_{k1} + s_{k2}}{2} \right] - \left[ \frac{k_1 + k_2 - x - y}{m + n + 2} \right] \quad \text{if } x < k_1, y < k_2$$

If the computed quantities using the above equations lie beyond [0,1], then the corresponding limit values are substituted for the conditional probabilities. Also, the above formulation can be extended to include more than three nodes as the predecessors of the result nodes like wear1 817.

Returning to FIG. 9, the dynamic distance classifier computes the decision boundaries and probabilities for correct classification. The latter are used in the heuristic rules described above to generate the conditional probabilities. These, combined with the decision boundaries and the relational structure, e.g., the influence diagram shown in FIG. 8, are used to automatically generate the knowledge base. This step consists of writing the required information into the format for the knowledge base structure the Influence Diagram Expert System 154 expects. The generated knowledge base is used according to the method described above with respect to FIGS. 2 and 3.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

I claim:

1. A system for predicting the life of a cutting tool in an automated metal cutting machine, comprising:
   a plurality of sensors for measuring physical data relating to a cutting operation of said machine; and
   a computer connected to said sensors, comprising
   a feature extractor for transforming said physical data into feature values;
   a tool life predictor for arriving at a prediction of the life of said cutting tool, having
      an influence diagram having an input level of feature nodes, intermediate nodes connected to said feature nodes and to a machining class node, an output node connected to said intermediate nodes;
      a first module for computing averages of feature values for each sensor;

a second module responsive to said feature averages for making a classification of said feature average as indicative of a long life or a short life; and a third module connected to said influence diagram for combining said classifications to arrive at a classification and a conditional probability at each intermediate node and a classification at said output node which is the predicted life of said cutting tool.

2. The system of claim 1 further comprising:

a life prediction verifier responsive to said classification at said output node of said life predictor, for arriving at a verification of said predicted life of said cutting tool, having an influence diagram having an input level of feature nodes, intermediate nodes connected to said feature nodes and to a machining class node, an output node connected to said intermediate nodes;

a fourth module for obtaining maximum values of feature values for each sensor;

a fifth module responsive to said maximum values for making a classification of said maximum values as indicative of a long life or a short life; and a sixth module connected to said influence diagram for combining said classifications to arrive at a classification and a conditional probability at each intermediate node and a classification at said output node which is the verification of the predicted life of said cutting tool.

3. The system of claim 2 further comprising a tool wear diagnostic module responsive to said predicted life of said cutting tool and to said verification of said predicted life of said cutting tool, for arriving at a diagnosis of wear of said cutting tool, having an influence diagram having an input level of feature nodes, intermediate nodes connected to said feature nodes and to a machining class node, an output node connected to said intermediate nodes;

a seventh module responsive to said feature values for making a classification of said feature values as indicative of a tool being worn or not worn; and an eighth module connected to said influence diagram for combining said classifications to arrive at a classification and a conditional probability at each intermediate node and a classification at said output node which is the diagnosis of wear of said cutting tool.

4. The system of claim 1, wherein said sensors comprise:

a strain gage.

5. The system of claim 1, wherein said sensors comprise:

a spindle current sensor.

6. The system of claim 1, wherein said sensors comprise:

a feed current sensor.

7. The system of claim 1, wherein said sensors comprise:

a dynamometer.

8. The system of claim 1, wherein said sensors comprise:

an accelerometer for sensing vibrations in said machine.

9. A system for predicting the life of a cutting tool in an automated metal cutting machine, comprising:

(a) a plurality of sensors for measuring physical data relating to a cutting operation of said machine; and (b) a computer connected to said sensors, comprising (b.1) a feature extractor for transforming said physical data into feature values;

(b.2) a tool life predictor responsive to said feature values, said tool life predictor operative to arrive at a predicted tool life of said cutting tool, including:

a knowledge base having an influence diagram with an input level of feature nodes, intermediate nodes connected to said feature nodes and to a machining class node, and an output node connected to said intermediate nodes;

a first module for computing a quantity associated with each sensor which is a function of feature values for each sensor;

a second module responsive to said quantity for making a classification of said quantity as indicative of a long life or a short life; and a third module connected to said influence diagram for combining said classifications to arrive at a classification and a conditional probability at each intermediate node and a classification at said output node which is said predicted tool life of said cutting tool;

(b.3) a tool life prediction verifier responsive to said predicted tool life and said feature values for arriving at a verification of said predicted tool life; and (b.4) a tool wear diagnostic module responsive to said predicted tool life, said verification and said feature values to continuously diagnose said tool for a worn out condition to arrive at a diagnosis of tool wear of said cutting tool.

10. The system of claim 9 wherein said quantities are averages of feature values for each sensor.

11. The system of claim 9 where said quantities are maximum values of said feature values for each sensor.

12. The system of claim 9 wherein said a tool wear diagnostic module comprises:

a knowledge base having an influence diagram with an input level of feature nodes, intermediate nodes connected to said feature nodes and to a machining class node, and an output node connected to said intermediate nodes;

a first module responsive to said feature values for making a classification of said feature value as indicative of said tool being worn or not worn; and a second module connected to said influence diagram for combining said classifications to arrive at a classification and a conditional probability at each intermediate node and a classification at said output node which is said diagnosis of tool wear for said cutting tool.

13. A method of operating a metal cutting machine having a cutting tool, comprising the steps of:

(a) attaching at least one sensor to said metal cutting machine;

(b) commencing a metal cutting procedure;

(c) observing wear of said cutting tool and noting when said cutting tool is worn out according to some criterion;

(d) collecting data from said sensors;

(e) selecting from said sensors features which influence the wear of said cutting tool;

(f) inputting said features into an influence diagram having an input level for said features; and (g) using said influence diagram for predicting the life of said tool.

14. The method of operating a metal cutting machine of claim 13, further comprising the step of:

(h) verifying the predicted life at the mid-point of the predicted life.

15. The method of operating a metal cutting machine of claim 13, wherein step (e) further comprises the step of:

(e.1) determining decision boundaries for the data collected in step (d).

16. The method of operating a metal cutting machine of claim 13, wherein step (e) further comprises the steps of:

(e.2) selecting machining parameters for categorizing the machining operation; and (e.3) building an influence diagram for modelling the wear of said cutting tool based on the data from said sensors.

17. A method for learning in a real-time expert system, comprising the steps of:

(a) creating a relational structure corresponding to the influences that a first and a second variable have on a third variable;

(b) obtaining data for said first variable, said second variable, and said third variable over some duration of time;

(c) selecting a tolerance zone around a sample that divides classes; and (d) using a dynamic distance classifier, which is responsive to said tolerance zone, to determine decision boundaries for said first and second variables and probabilities associated with said decision boundaries, said probabilities indicating the confidence with which a decision boundary classifies values of said first and second variables with respect to the value of said third variable.

* * * * *